United States Patent
Shaffer et al.

(10) Patent No.: US 7,769,156 B2
(45) Date of Patent: Aug. 3, 2010

(54) SYSTEM AND METHOD FOR PROVIDING A REVERSE CAMP-ON FEATURE IN A COMMUNICATIONS ENVIRONMENT

(75) Inventors: Shmuel Shaffer, Palo Alto, CA (US); Labhesh Patel, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1498 days.

(21) Appl. No.: 11/117,247

(22) Filed: Apr. 27, 2005

(65) Prior Publication Data

US 2006/0245567 A1 Nov. 2, 2006

(51) Int. Cl.
*H04M 3/42* (2006.01)

(52) U.S. Cl. .................... 379/210.01; 379/300

(58) Field of Classification Search ................
379/209.01–218.02, 265.01–266.1
See application file for complete search history.

(56) References Cited

U.S. PATENT DOCUMENTS

| | | | | |
|---|---|---|---|---|
| 4,322,581 A * | 3/1982 | Christain et al. | ............ | 379/245 |
| 5,268,957 A * | 12/1993 | Albrecht | ................ | 379/209.01 |
| 6,028,922 A * | 2/2000 | Deutsch et al. | ........ | 379/211.02 |
| 6,501,750 B1 * | 12/2002 | Shaffer et al. | ................ | 370/352 |
| 6,601,099 B1 | 7/2003 | Corneliussen | ............... | 709/224 |
| 6,614,899 B1 | 9/2003 | Sollee et al. | ........... | 379/218.01 |
| 6,615,236 B2 | 9/2003 | Donovan et al. | ............ | 709/203 |
| 6,625,141 B1 | 9/2003 | Glitho et al. | ................. | 370/352 |
| 6,636,594 B1 | 10/2003 | Oran | ..................... | 379/201.01 |
| 6,658,095 B1 | 12/2003 | Yoakum et al. | .......... | 379/93.01 |
| 6,661,799 B1 | 12/2003 | Molitor | ...................... | 370/401 |
| 6,665,723 B2 | 12/2003 | Trossen | ..................... | 709/227 |
| 6,678,735 B1 | 1/2004 | Orton et al. | .................. | 709/230 |
| 6,684,147 B2 | 1/2004 | Park et al. | ..................... | 701/71 |
| 6,731,625 B1 | 5/2004 | Eastep et al. | ................. | 370/352 |
| 6,738,390 B1 | 5/2004 | Xu et al. | ..................... | 370/467 |
| 6,754,181 B1 | 6/2004 | Elliott et al. | ................ | 370/252 |
| 6,785,246 B2 | 8/2004 | Foti | ........................... | 370/261 |
| 6,788,676 B2 | 9/2004 | Partanen et al. | ............. | 370/352 |
| 7,266,591 B1 * | 9/2007 | Johnston | ..................... | 709/219 |
| 7,480,260 B1 * | 1/2009 | Vashisht et al. | ............. | 370/260 |
| 2002/0076032 A1 * | 6/2002 | Rodriguez et al. | ..... | 379/266.01 |
| 2002/0130791 A1 * | 9/2002 | Stumer | .................... | 340/932.2 |
| 2003/0081752 A1 * | 5/2003 | Trandal et al. | ......... | 379/210.01 |
| 2003/0161464 A1 * | 8/2003 | Rodriguez et al. | ..... | 379/266.01 |

* cited by examiner

*Primary Examiner*—Fan Tsang
*Assistant Examiner*—Assad Mohammed
(74) *Attorney, Agent, or Firm*—Baker Botts L.L.P.

(57) ABSTRACT

A method for facilitating a data session in a communications environment is provided that includes receiving, at a first endpoint, a call that was initiated by a second endpoint. The first endpoint is already engaged in a previous call. The method further includes invoking a reverse eCamp-On™ feature in response to receiving the call from the second endpoint such that the first endpoint initiates a new call to the second endpoint once the previous call is completed.

38 Claims, 3 Drawing Sheets

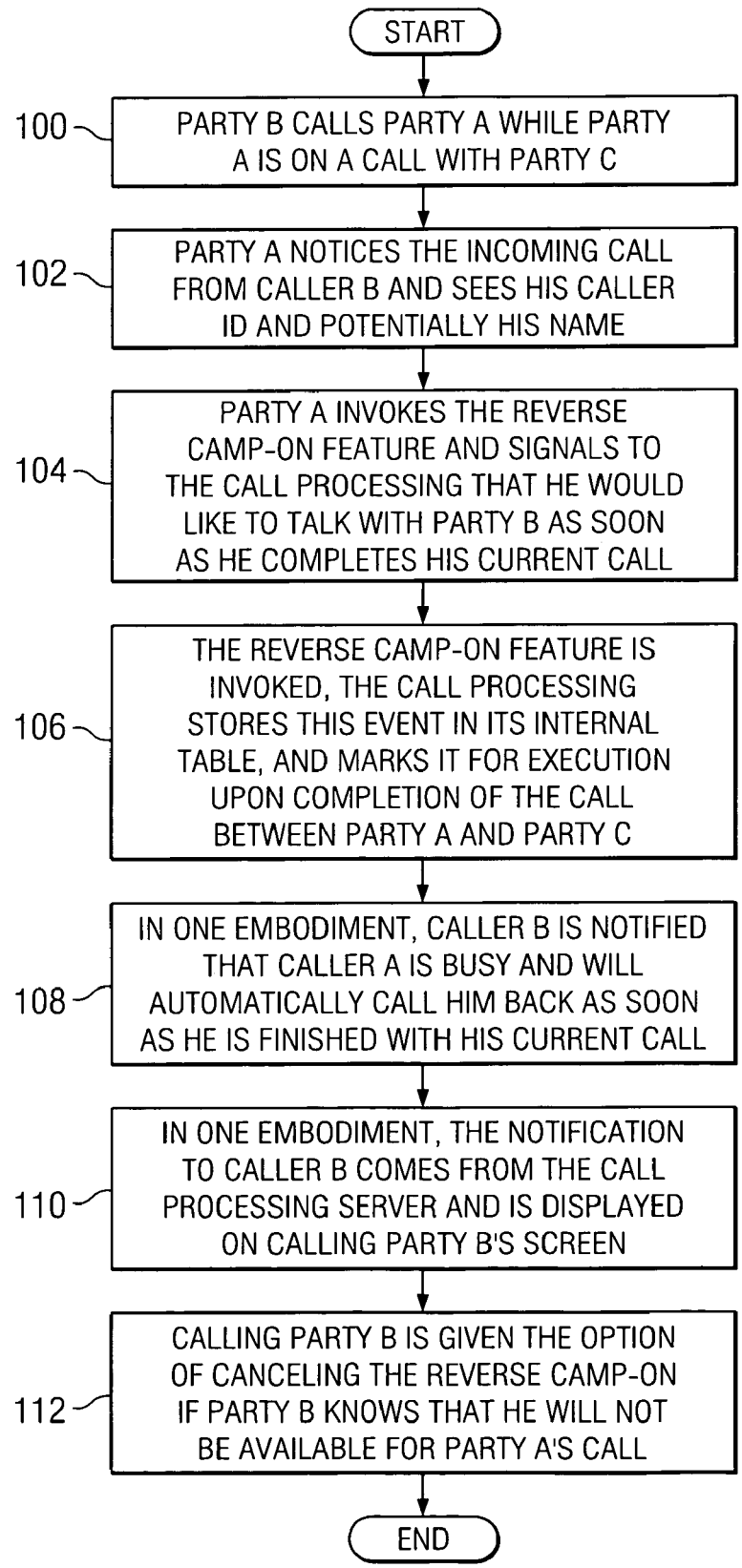

SYSTEM AND METHOD FOR PROVIDING A REVERSE CAMP-ON FEATURE IN A COMMUNICATIONS ENVIRONMENT

TECHNICAL FIELD OF THE INVENTION

This invention relates generally to communications and, more particularly, to a system and a method and for providing a reverse eCamp-On™ feature in a communications environment.

BACKGROUND OF THE INVENTION

The field of communications has become increasingly important in today's society. In particular, the ability to quickly and effectively interact with an individual (through any suitable communications media) presents a significant obstacle for component manufacturers, system designers, and network operators. This obstacle is made even more difficult due to the plethora of diverse communication technologies (e.g. Instant Messaging, cellular communications, simple voice sessions, etc.) that exist in the current marketplace.

As new communication platforms (such as session initiation protocol (SIP), for example) become available to the consumer, new protocols need to be developed in order to optimize this emerging technology. For example, one problem often encountered by a caller in any communications environment is being unable to reach a callee because the callee is not available. The called party may be unavailable for the call for any number of reasons. For example, the called party may be out of the office, on another line, e-mailing another party, preparing a document, talking on their cellular telephone, etc. The calling party is generally oblivious to this information, as he has no idea how to effectively contact this person. In some situations where the callee is busy, the caller can leave a simple voicemail or send them an e-mail (i.e. facilitate the phone-tag scenario). However, in some instances, a live discussion is necessary, whereby an interactive session should be accommodated.

This lack of knowledge and lack of interaction wastes valuable time, frustrates both parties, causes delays in communications, and inhibits productivity. Accordingly, this problem is a burden for any employee, employer, individual, or endpoint that seeks to execute a successful and productive communication session.

eCamp-On is generally a private branch exchange (PBX) feature. In an eCamp-On™ scenario, a calling party calls the called party whose phone is busy. The calling then party camps on the called party's phone and is called back when the (busy) called party phone becomes available. Cellular and Internet Protocol (IP) phones provide the user with a means of obtaining the number of callers whose calls have been missed. The called party can search the directory, select a number, and place a call. Lacking in such an environment is a feature that allows the (busy) called party to Camp-On the calling party and to invoke a call from the called party's phone to the calling party's phone.

SUMMARY OF THE INVENTION

From the foregoing, it may be appreciated by those skilled in the art that a need has arisen for an improved reverse Camp-On process that provides an effective solution for participants in a communications architecture. In accordance with an embodiment of the present invention, a system and a method for initiating and establishing a return call to a calling party is provided that substantially eliminate or greatly reduce disadvantages and problems associated with conventional communication strategies and protocols.

According to an embodiment of the present invention, a method for facilitating a data session in a communications environment is provided that includes receiving, at a first endpoint, a call that was initiated by a second endpoint. The first endpoint is already engaged in a previous call. The method further includes invoking a reverse eCamp-On™ feature in response to receiving the call from the second endpoint such that the first endpoint initiates a new call to the second endpoint once the previous call is completed.

In more particular embodiments, the second endpoint receives a notification that the first endpoint has invoked the reverse eCamp-On™ feature and, further, upon receiving the notification, the second endpoint is given an option to cancel the reverse eCamp-On™ feature.

In still other embodiments, the notification is an audible message or an Instant Message. Yet other embodiments offer the notification being presented on a display associated with the second endpoint. Certain other embodiments allow the second endpoint to be parked (e.g. accompanied by music on hold, current sales numbers of a given company, or any other relevant or entertaining information) until the first endpoint completes the previous call.

Certain embodiments of the present invention may provide a number of technical advantages. For example, according to one embodiment of the present invention, an architecture and a process are provided that offer a reverse Camp-On feature and a mechanism for which it can be invoked. Additionally, the present invention offers a means of notifying the calling party that a reverse Camp-On feature has been invoked by the called party. The calling party is provided with the capability of canceling the reverse Camp-On function if he cannot receive the return call (e.g. he is about to leave his office).

The proffered architecture can also avoid time-consuming endeavors that inhibit productivity. Hence, the proverbial "phone-tag" scenario is effectively avoided by the present invention. Also, in the context of a business environment, the reverse eCamp-On™ feature yields a significant improvement in efficiency parameters, as important missed calls can be quickly returned. Moreover, such a protocol may be performed with minimal individual effort from the callee, as the reverse eCamp-On™ feature may be invoked via a hardware button, via a menu selection, or executed autonomously.

Certain embodiments of the present invention may enjoy some, all, or none of these advantages. Other technical advantages may be readily apparent to one skilled in the art from the following figures, description, and claims.

BRIEF DESCRIPTION OF THE FIGURES

To provide a more complete understanding of the present invention and features and advantages thereof, reference is made to the following description, taken in conjunction with the accompanying figures, wherein like reference numerals represent like parts, in which:

FIG. 3 is a simplified block diagram illustrating an example operational flow of the communication system of FIG. 1.

DETAILED DESCRIPTION OF THE INVENTION

Figure 1:
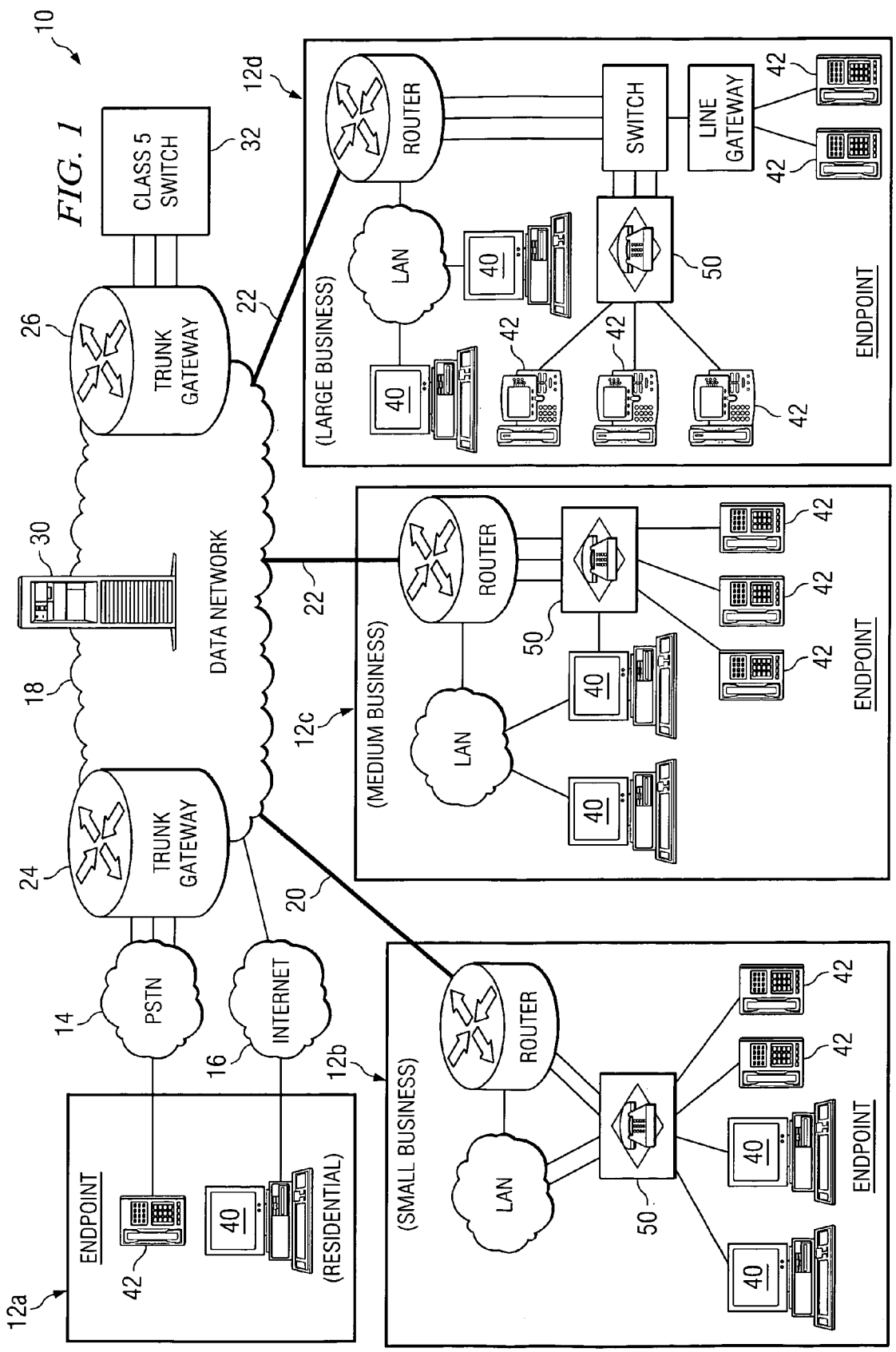
FIG. 1 is a simplified block diagram illustrating a communication system that may implement a reverse eCamp-On™ feature in accordance with one embodiment of the present invention.

FIG. 1 is a simplified block diagram of a communication system 10 for communicating, receiving, and transmitting data in a communications environment (e.g. session initiation protocol (SIP) environment). Communication system 10 includes branch offices (or endpoints) 12a-12d, a public switched telephone network (PSTN) 14, an Internet 16, a data network 18, a broadband access link 20, and a number of additional links 22 (which may include, for example, a digital subscriber line (DSL) link, a T1 link, a fiber optic link, and a wireless link). Communication system 10 also includes a set of trunk gateways 24 and 26, a 3rd-party application server 30, and a Class-5 switch 32.

Endpoint 12a represents a residential location, which consists of a computer 40 and several telephones 42. Telephones 42 may be an Internet protocol (IP) telephone or a standard telephone that is operable to interface with computer 40 such that one or more capabilities of SIP are enabled through telephone 42. Accordingly, two types of telephones are illustrated in FIG. 1. Branch office 12b represents a small business entity (e.g., a small branch office), which consists of a local area network (LAN), a router, several computers 40, and several telephones 42. Branch office 12c represents a medium business entity (e.g., a medium branch office), which consists of a LAN, router, a private branch exchange (PBX) or key system, several computers 40, and several telephones 42. Branch office 12d is a large business entity (e.g., a large branch office), which consists of a LAN, a router, a switch, a line gateway, several computers 40, and several telephones 42. Note that branch offices 12b, 12c, and 12d, which are inclusive of suitable "endpoints", each include a communications platform 50, which is operable to communicate with any number of devices (e.g. telephones 42 and/or computer 40). In one embodiment, communications platform 50 is a Call Manager element, which is manufactured by Cisco Systems, Inc. of San Jose, Calif. The Call Manager element may be SIP-enabled. In other embodiments, communications platform 50 is any suitable unit that is operable to interface with end-user devices (e.g. telephone 42, computer 40, etc.).

In accordance with the teachings of the present invention, communication system 10 offers a new reverse eCamp-On™ technology service that allows for an effective and prompt return call for a called party. Specifically, communication system 10 provides a mechanism for party A, who receives an incoming call from party B while he is on a call with party C, to Camp-On the incoming call and to automatically invoke a call to party B as soon as his call with party C ends. Thus, the tendered architecture offers a reverse Camp-On feature and a mechanism to invoke it. Moreover, the present invention offers a means of notifying the calling party that a reverse Camp-On has been invoked by the called party. The calling party is then provided with the capability of canceling the reverse Camp-On if he is unable to receive the subsequent call.

Branch offices 12a-d are SIP-compatible elements that include hardware and/or software that is operable to receive and to transmit data (directly or indirectly) and to implement the reverse eCamp-On™ feature as outlined herein. Note that the term "branch office" and "end point" are interchangeable and, further, the term "endpoint" encompasses a myriad of potential devices and infrastructure that may benefit from the operations of communication system 10. Endpoints may be a personal digital assistant (PDA), a cellular telephone, a standard telephone (which may be coupled to a personal computer) an IP telephone, a personal computer, a laptop computer, a mobile telephone, or any other suitable device or element (or any appropriate combination of these elements) that is operable to receive data or information. Each branch office may also include suitable network equipment and appropriate infrastructure (e.g., switches, routers, LANs, gateways, endpoints, etc.) to facilitate a SIP session. FIG. 1 illustrates only one set of example devices that may be used within communication system 10. The present invention is replete with numerous alternatives that could be used to facilitate the operations of communication system 10.

It should also be noted that the internal structure of branch offices (or endpoints) 12a-d are malleable and can be readily changed, modified, rearranged, or reconfigured in order to achieve their intended operations as they pertain to the reverse eCamp-On™ mode function. As identified supra, software and/or hardware may reside in endpoints or branch offices 12a-d in order to achieve the teachings of the reverse eCamp-On™ feature of the present invention. Specifically, such items may be included in (or loaded into) any targeted communications platform (e.g. communications platform 50, telephones 42 and/or computers 40). (Note that, in certain embodiments, communications platform(s) 50 may execute the requisite operations of the reverse eCamp-On™ feature without assistance from any other element.) However, due to their flexibility, these elements (i.e. telephones 42, computers 40, and communications platform 50) may alternatively be equipped with (or include) any suitable component, device, application specific integrated circuit (ASIC), processor, microprocessor, algorithm, computer readable medium, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of the elements included within endpoints or branch offices 12a-d in the context of communication system 10 and, accordingly, it should be construed as such.

For purposes of teaching and discussion, it is useful to provide some overview as to the way in which the following invention operates in a SIP environment. The following foundational information may be viewed as a basis from which the present invention may be properly explained. Such information is offered earnestly for purposes of explanation only and, accordingly, should not be construed in any way to limit the broad scope of the present invention and its potential applications. Though the current invention is illustrated in the SIP environment, it is not limited to SIP and can actually apply to any other VoIP, as well as TDM implementation.

There are many applications that require the creation and management of a session, where a session is considered an exchange of data between an association of participants. The implementation of these applications is complicated by the practices of participants: users may move between endpoints, they may be addressable by multiple names, and they may communicate in several different media: in many cases simultaneously. Certain protocols have been developed to carry various forms of real-time multimedia session data such as voice, video, or text messages.

The SIP features of communication system 10 work in concert with these protocols by enabling endpoints (generally referred to as "user agents") to discover one another and to agree on a characterization of a session they would like to share. For locating prospective session participants, and for other functions, SIP enables the creation of an infrastructure of network hosts (generally referred to as proxy servers) to which user agents can send registrations, invitations to sessions, and other requests. SIP is an agile, general-purpose tool for creating, modifying, and terminating sessions. SIP works independently of underlying transport protocols and without dependency on the type of session that is being established.

SIP is an application-layer control protocol that can establish, modify, and terminate multimedia sessions (conferences) such as Internet telephony calls. SIP can also invite participants to already existing sessions, such as multicast conferences. Media can be added to (and removed from) an existing session. SIP transparently supports name mapping and redirection services, which supports personal mobility. End users can maintain a single externally visible identifier regardless of their network location.

SIP supports five facets of establishing and terminating multimedia communications: 1) user location: determination of the end system to be used for communication; 2) user availability: determination of the willingness of the called party to engage in communications; 3) user capabilities: determination of the media and media parameters to be used; 4) session setup: "ringing" establishment of session parameters at both called and calling party locations; and 5) session management: including transfer and termination of sessions, modifying session parameters, and invoking services.

A standard SIP platform does not provide services. Rather, SIP provides primitives that can be used to implement different services. For example, SIP can locate a user and deliver an opaque object to his current location. If this primitive is used to deliver a session description written in SDP, for instance, the endpoints can agree on the parameters of a session. If the same primitive is used to deliver a photo of the caller as well as the session description, a "caller ID" service can be easily implemented.

Figure 2:
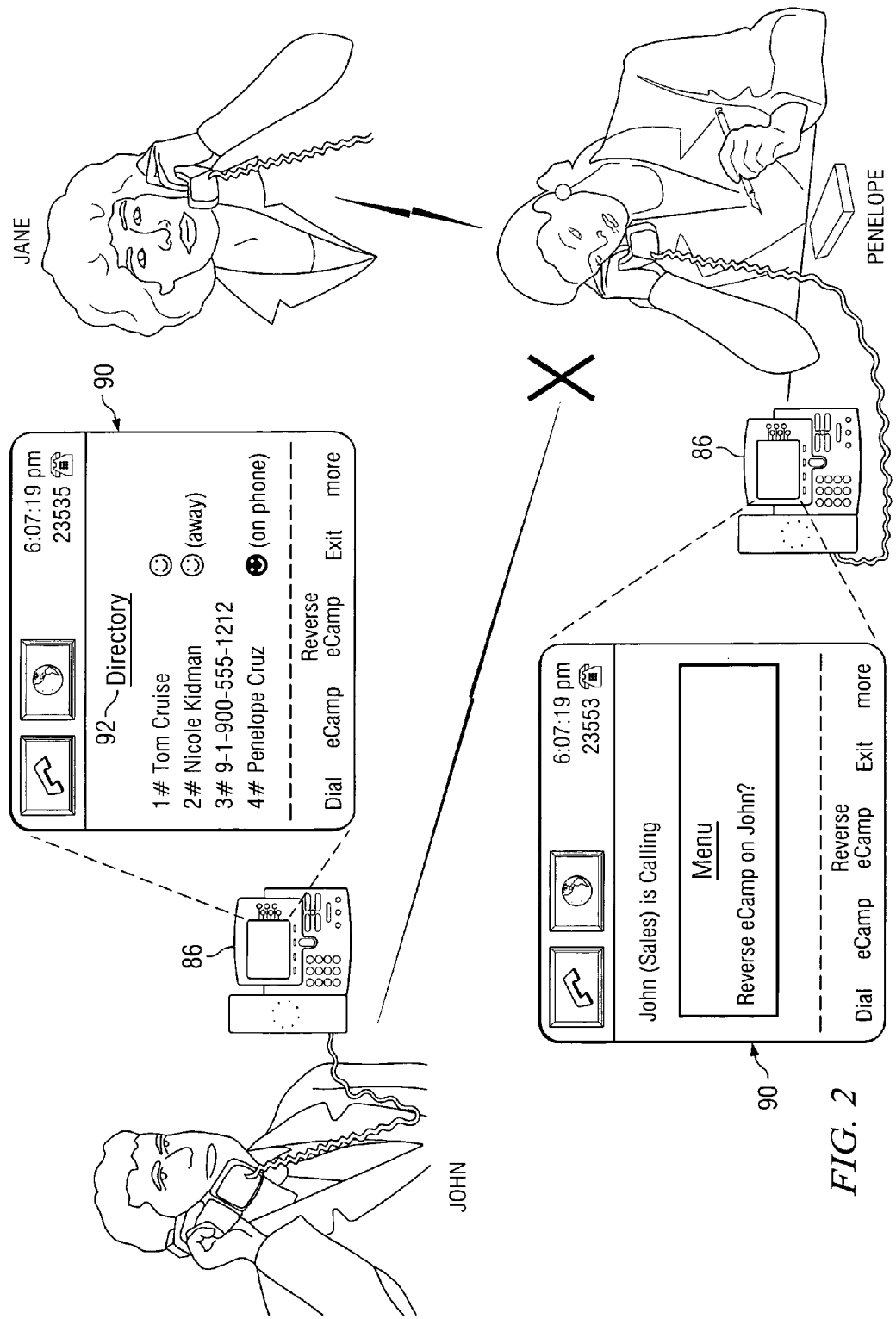
FIG. 2 is a simplified block diagram illustrating an example operational flow of an eCamp-On™ scenario.

Referring now to FIG. 2, FIG. 2 is a simplified block diagram of an example operational flow associated with the communication system of FIG. 1. FIG. 2 includes multiple IP telephones 86, which may include a display 90 that includes a directory 92. In addition, IP telephones 86 include a reverse eCamp-On™ feature provided on a button that, when depressed, can initiate the reverse eCamp-On™ feature as outlined herein.

FIG. 2 illustrates a case where John (from the Sales department) seeks to talk to Penelope, who is engaged on a call with her supervisor Jane. Through the SIP architecture and the reverse eCamp-On™ feature, John can see that Penelope is busy speaking to someone else. Rather than have John leave a voice-mail message or an Instant Message for Penelope, Penelope sees that John is trying to call her and elects to reverse camp onto his extension. Thus, Penelope is afforded the opportunity to generate a subscription to this extension.

Note that several reverse eCamp-On™ options can be provided to a given end user. In the case of FIG. 2, a hardware button can be invoked to trigger this functionality. In other cases, a software implementation could be used such that a menu scenario is offered. This software arrangement could guide the end user to execute a reverse eCamp-On™, as is illustrated by the prompting message on Penelope's screen. In still other scenarios, a hybrid function could be provided that changes based on state information. All such possibilities are clearly within the broad scope of the present invention.

FIG. 3 is a simplified flowchart illustrating another example associated with a flow for communication system 10. Some of the nuances of the present invention may be best understood by the following example. Assume a scenario in which party B calls party A while party A is on a call with party C. This is illustrated by step 100. Party A notices the incoming call from caller B and sees his caller ID and potentially his name, as is illustrated by step 102. Party A cannot interrupt his current call with party C but would like to talk with caller B immediately after he completes the call with party C.

In accordance with the proffered invention, party A invokes the reverse eCamp-On™ feature and signals to the call processing module (e.g. included in communications platform 50) that he would like to talk with party B as soon as he completes his current call. This is illustrated by step 104.

In this one non-limiting embodiment, the phone being employed by the called party has a hardware button that can be used to invoke the reverse eCamp-On™ feature. In another embodiment, the screen of the IP phone prompts or presents the reverse eCamp-On™ option to party A as soon as the appropriate scenario is detected (i.e. incoming call from a "dialable" caller ID while on another call). In yet another embodiment, party A can select the reverse eCamp-On™ feature from a menu that is provided in appropriate software. In any case, the reverse eCamp-On™ feature is invoked and the call processing module stores this event in its internal table, whereby it is marked for execution upon completion of the call between party A and party C. This is illustrated by step 106.

In accordance with a particular embodiment, rather than being transferred to party A's voicemail, caller B is parked in a MoH (music on hold) service until caller A becomes available. In another embodiment, caller B is notified that caller A is busy and will automatically call him back as soon as he is finished with his current call. This is illustrated by step 108. The notification to caller B may be audible and come from an announcement server, via an instant messaging (IM) message, via e-page services, via SMS message, or via any other suitable notification services. In another embodiment, the notification to caller B comes from the call processing server and is displayed on calling party B's screen. This is illustrated by step 110.

In accordance with still another embodiment of the present invention, calling party B is given the option of canceling the reverse eCamp-On™ function if party B knows that he is about to step out off his office and will not be available for party A's call. This is illustrated by step 112.

It is important to note that the stages and steps in FIGS. 2 through 3 illustrate only some of the possible scenarios that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the tasks and operations of the elements and activities associated with executing reverse eCamp-On™ functions.

Although the present invention has been described in detail with reference to particular embodiments, it should be understood that various other changes, substitutions, and alterations may be made hereto without departing from the spirit and scope of the present invention. The illustrated network architecture of FIG. 1 has only been offered for purposes of example and teaching. Suitable alternatives and substitutions are envisioned and contemplated by the present invention: such alternatives and substitutions being clearly within the broad scope of communication system 10. For example, the use of the LAN could easily be replaced by a virtual private network (VPN), a metropolitan area network (MAN), a wide area network (WAN), a wireless LAN (WLAN), or any other element that facilitates data propagation for endpoints or branch offices 12a-d. Using analogous reasoning, the routers and switches illustrated by FIG. 1 may be supplanted by bridges, hubs, gateways, or any other suitable devices that are conducive to network communications. In addition, while the foregoing discussion has focused on SIP, any other suitable session protocol may benefit from the teachings provided herein. The present invention is not confined to the SIP platform.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. A method for facilitating a data session in a session initiation protocol environment, comprising: receiving, at a first endpoint, a call that was initiated by a second endpoint, wherein the first endpoint is already engaged in a previous call;
   invoking, by the first endpoint, a reverse camp-on feature in response to receiving the call from the second endpoint; and
   automatically initiating, by a terminal of the first endpoint using the reverse camp-on feature, independently of a notification from the second endpoint, a new call to the second endpoint once the previous call is completed.

2. The method of claim 1, wherein the second endpoint receives a notification that the first endpoint has invoked the reverse camp-on feature, the notification identifying the first endpoint.

3. The method of claim 2, wherein upon receiving the notification the second endpoint is given an option to cancel the reverse camp-on feature.

4. The method of claim 2, wherein the notification is an audible message, and Instant Message, an e-page notification, an SMS message, or a notification service.

5. The method of claim 2, wherein the notification is displayed on a display associated with the second endpoint.

6. The method of claim 1, wherein the reverse camp-on feature is invoked via a button provided at the first endpoint.

7. The method of claim 1, wherein the reverse camp-on feature is invoked via a soft button using software that comprises a menu.

8. The method of claim 1, wherein the first endpoint is operable to recognize an identity associated with the second endpoint while the first endpoint is on the previous call.

9. The method of claim 1, further comprising:
   parking the second endpoint until the first endpoint completes the previous call.

10. A method for facilitating a data session in a session initiation protocol environment, comprising:
    communicating with a first endpoint and a second endpoint, whereby the second endpoint initiates a call intended for the first endpoint, wherein the first endpoint is already engaged in a previous call; and
    facilitating execution of a reverse camp-on feature that can be invoked such that the first endpoint automatically initiates, according to the reverse camp-on feature, independently of a notification from the second endpoint, a new call to the second endpoint once the previous call is completed.

11. The method of claim 10, wherein the second endpoint receives a notification that the first endpoint has invoked the reverse camp-on feature, the notification identifying the first endpoint.

12. The method of claim 11, wherein upon receiving the notification the second endpoint is given an option to cancel the reverse camp-on feature.

13. The method of claim 11, wherein the notification is an audible message, an Instant Message, an e-page notification, an SMS message, or a notification service.

14. The method of claim 11, wherein the reverse camp-on feature is invoked via a soft button using software that comprises a menu.

15. The method of claim 11, wherein the first endpoint is operable to recognize an identity associated with the second endpoint while the first endpoint is on the previous call.

16. The method of claim 11, further comprising:
    parking the second endpoint until the first endpoint completes the previous call.

17. Software for facilitating a data session in a session protocol environment, the software being embodied in a computer readable medium and comprising computer code such that when executed is operable to:
    communicate with a first endpoint and a second endpoint, whereby the second endpoint initiates a call intended for the first endpoint, wherein the first endpoint is already engaged in a previous call; and
    facilitate execution of a reverse camp-on feature that can be invoked such that the first endpoint automatically initiates, according to the reverse camp-on feature, independently of a notification from the second endpoint, a new call to the second endpoint once the previous call is completed.

18. The medium of claim 17, wherein the second endpoint receives a notification that the first endpoint has invoked the reverse camp-on feature, the notification identifying the first endpoint.

19. The medium of claim 18, wherein upon receiving the notification the second endpoint is given an option to cancel the reverse camp-on feature.

20. The medium of claim 18, wherein the notification is an audible message, an Instant Message, an e-page notification, an SMS message, or a notification service.

21. The medium of claim 18, wherein the reverse camp-on feature is invoked via a soft button using software that comprises a menu.

22. The medium of claim 18, wherein the first endpoint is operable to recognize an identity associated with the second endpoint while the first endpoint is on the previous call.

23. The medium of claim 18, wherein the code is further operable to:
    park the second endpoint until the first endpoint completes the previous call.

24. An apparatus for facilitating a data session in a session initiation protocol environment, comprising:
    a communications platform that is operable to:
        communicate with a first endpoint and a second endpoint, whereby the second endpoint initiates a call intended for the first endpoint, wherein the first endpoint is already engaged in a previous call, facilitate execution of a reverse camp-on feature that can be invoked such that the first endpoint automatically initiates, according to the reverse camp-on feature, independently of a notification from the second endpoint, a new call to the second endpoint once the previous call is completed.

25. The apparatus of claim 24, wherein the second endpoint receives a notification that the first endpoint has invoked the reverse camp-on feature, the notification identifying the first endpoint.

26. The apparatus of claim 25, wherein upon receiving the notification the second endpoint is given an option to cancel the reverse camp-on feature.

27. The apparatus of claim 25, wherein the notification is an audible message, an Instant Message, an e-page notification, an SMS message, or a notification service.

28. The apparatus of claim 25, wherein the reverse camp-on feature is invoked via a soft button using software that comprises a menu.

29. The apparatus of claim 25, wherein the first endpoint is operable to recognize an identity associated with the second endpoint while the first endpoint is on the previous call.

30. The apparatus of claim 24, wherein the communications platform is a Call Manager element.

31. The apparatus of claim 24, wherein the communications platform is operable to park the second endpoint until the first endpoint completes the previous call.

32. A system for facilitating a data session in a session initiation protocol environment, comprising:

means for communicating with a first endpoint and a second endpoint, whereby the second endpoint initiates a call intended for the first endpoint, wherein the first endpoint is already engaged in a previous call; and means for facilitating execution of a reverse camp-on feature that can be invoked such that the first endpoint automatically initiates, according to the reverse camp-on feature, independently of a notification from the second endpoint, a new call to the second endpoint once the previous call is completed.

33. The system of claim 32, wherein the second endpoint receives a notification that the first endpoint has invoked the reverse camp-on feature, the notification identifying the first endpoint.

34. The system of claim 33, wherein upon receiving the notification the second endpoint is given an option to cancel the reverse camp-on feature.

35. The system of claim 33, wherein the notification is an audible message, an Instant Message, an e-page notification, an SMS message, or a notification service.

36. The system of claim 33, wherein the reverse camp-on feature is invoked via a soft button using software that comprises a menu.

37. The system of claim 33, wherein the first endpoint is operable to recognize an identity associated with the second endpoint while the first endpoint is on the previous call.

38. The system of claim 33, further comprising:

means for parking the second endpoint until the first endpoint completes the previous call.

\* \* \* \* \*